No. 838,091. PATENTED DEC. 11, 1906.
H. P. DYER.
APPARATUS FOR TREATING LIQUIDS WITH GASES.
APPLICATION FILED DEC. 18, 1905.
2 SHEETS—SHEET 1.
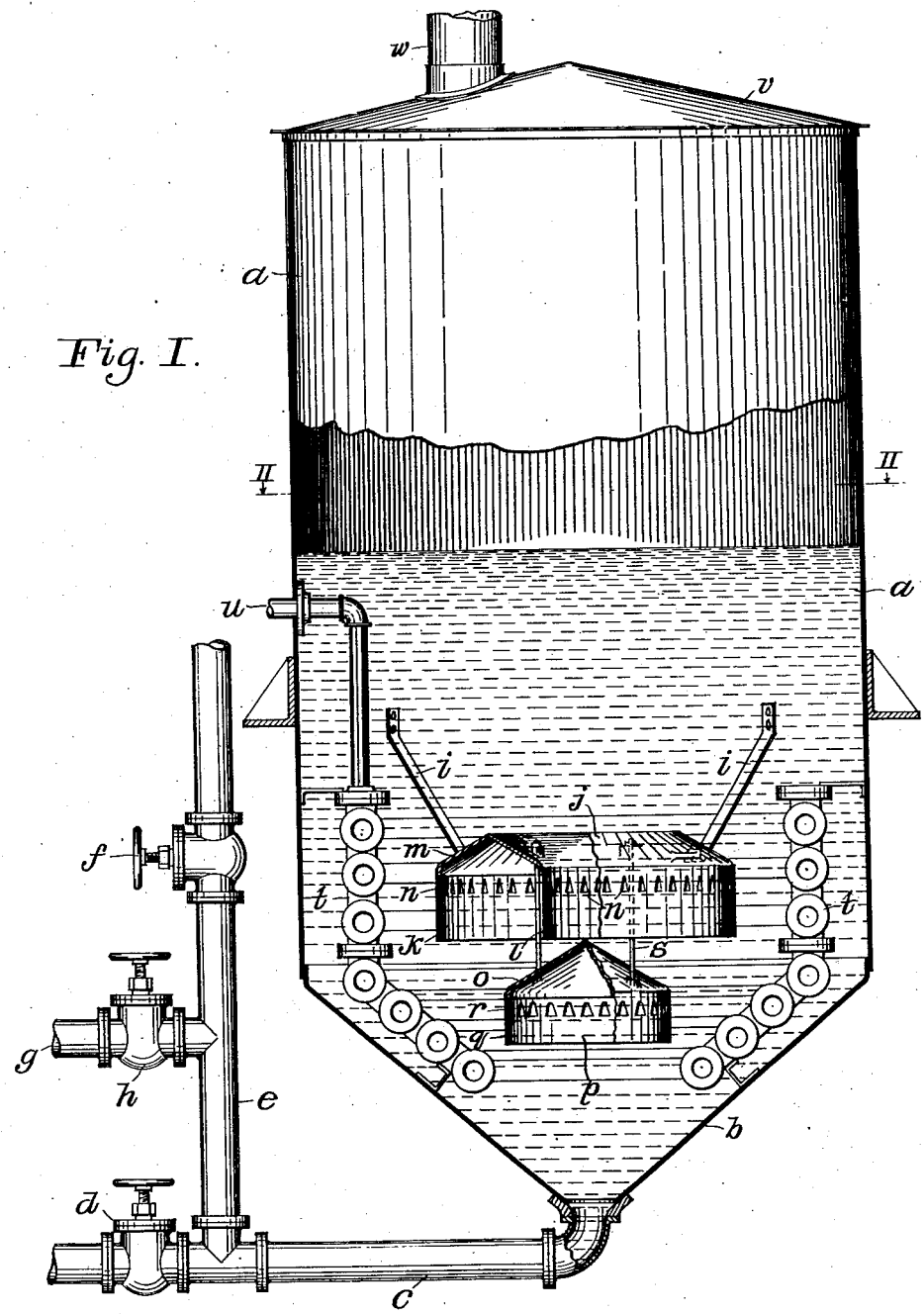
Witnesses,
Jno. T. Sullivan
John F. Strauss
Inventor,
Harold P. Dyer,
by Luther G. Hopper,
Attorney.

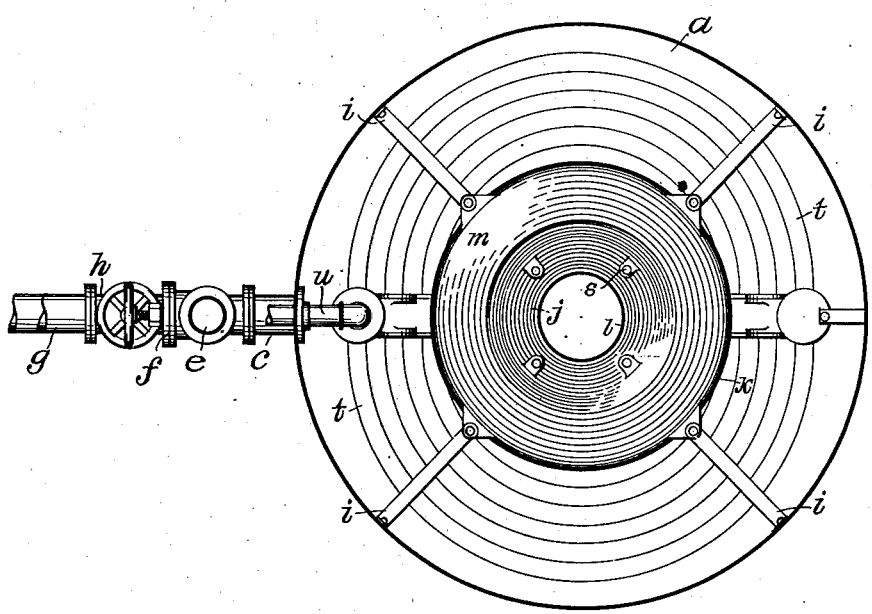

UNITED STATES PATENT OFFICE.

HAROLD P. DYER, OF CLEVELAND, OHIO, ASSIGNOR TO THE DYER COMPANY, OF CLEVELAND, OHIO, A CORPORATION.

APPARATUS FOR TREATING LIQUIDS WITH GASES.

No. 838,091.     Specification of Letters Patent.     Patented Dec. 11, 1906.

Application filed December 18, 1905. Serial No. 292,162.

*To all whom it may concern:*

Be it known that I, HAROLD P. DYER, a citizen of the United States, residing at Cleveland, in the county of Cuyahoga and State of Ohio, have invented certain new and useful Improvements in Apparatus for Treating Liquids with Gases, of which the following is a specification.

My invention pertains to apparatus designed to accomplish the intermingling of gases and liquids, and it is particularly related to such apparatus whereby liquids are clarified or otherwise acted upon by gases.

The apparatus herein described is especially adapted to the carbonation and clarification of beet-root or cane juices which have previously been treated with lime, in which operation carbonic-acid gas is introduced and passed through said juices for the purpose of breaking up saccharate of lime and precipitating the free lime contained therein. It may, however, be advantageously employed in other operations where it is desired to distribute a gaseous element throughout a body of liquid.

Efficiency, together with convenience of construction and operation, are the prime objects of the present invention, and they are attained by providing improved and simple means for breaking up and distributing gas-bubbles throughout the liquid to be treated by preventing the clogging of conduits and apertures, by rendering the apparatus substantially self-cleaning, and by minor arrangements which will become apparent from the description.

By way of example an apparatus constructed in accordance with this invention is illustrated in the accompanying drawings, in which—

Figure I is a side elevation and partial section, and Fig. II is a plan view and section on line II II of Fig. I.

The reference-letter $a$ indicates a tank having a vertically-disposed cylindrical shell and a bottom $b$, shaped as an inverted cone. A large pipe $c$ leads downward from the apex of the conical bottom and serves as both an inlet and an outlet for liquid and also as an inlet for gas. An outlet-valve $d$ is connected in the pipe $c$, and between the tank $a$ and said valve a branch pipe $e$ is led upward from pipe $c$ and provided with a valve $f$. A second branch pipe $g$ enters the pipe $e$ between valve $f$ and pipe $c$, being provided with a valve $h$. Thus it is evident that the valves $d$ and $f$ being closed and valve $h$ opened liquid under pressure may be forced into the tank $a$ through the pipes $g$ and $c$. After a sufficient amount of liquid has been admitted the valve $h$ may be closed and the valve $f$ opened to admit gas, which latter may then be forced under pressure through pipes $e$ and $c$ into the bottom of the tank, whereupon gaseous globules of irregular shape and volume will be formed which belch from the pipe and rise rapidly through the liquid contained in the tank.

The bubbles or globules of gas entering the tank are too large and are not sufficiently distributed to perform effective service in the saturation of the liquid. I have therefore provided novel bubble breakers and distributors which I will proceed to describe. Suspended by suitable hangers $i$ or otherwise secured concentrically within the tank $a$ in the lower part of the cylindrical section thereof is an open-bottomed annular gas receiver and distributer $j$, comprising an outer cylindrical shell $k$, an inner cylindrical shell $l$, and a rigid top $m$, as shown. Ranged horizontally in the upper ends of both the said inner and outer shells are apertures $n$, preferably of a triangular shape with acute angles at their tops. Another circular gas receiver and distributer $p$ of a smaller diameter than the receiver $j$ is located upon a common axis with and underneath the latter, projecting well down into the conical bottom of the tank, as shown in Fig. I. The receiver $p$ is a cylindrical shell $q$, having a conical top $o$ and is provided with apertures $r$, ranged horizontally in the upper end of its shell. The apertures $r$ are preferably triangular, but broader than the apertures $n$. The receiver $p$ may be held in place by any suitable means; but I prefer to suspend it from the receiver $j$ by bolts $s$ or other suitable hangers, so that the conical tank-bottom $b$ may be kept as free from obstructions as possible. A steam-heating coil $t$ may be placed in the tank $a$ and supplied through the pipe $u$. A cover $v$ may also be employed and provided with a ventilator-pipe $w$, through which the waste gases and vapors may escape to the outer atmosphere.

In the operation of the apparatus the liquid to be treated is forced into the tank $a$ through the valve $h$ and pipes $g$ and $c$. The valve $h$ is then closed, and the valve $f$ being opened gas is forced into the bottom of the tank $a$, rising through the liquid therein and collecting in the upper portion of the receiver $p$. When the surface of the liquid in the receiver $p$ is forced down by the collecting gas substantially to the level of the apertures $r$, the gas flows out through said apertures, forming small bubbles which, being buoyant, tend to rise as soon as they become detached from the surface of the receiver. Consequently nearly all of these gas-bubbles rise at once through the liquid and are caught and collected in the annular-shaped receiver $j$.

The operation is substantially repeated in the receiver $j$, the gas collected therein being forced out through the numerous narrow apertures $n$. The apertures $n$ being smaller than the apertures $r$ and the liquid in the collector $j$ not being so violently agitated as in the collector $p$, the bubbles issuing from the apertures $n$ are smaller and more uniform in size than those rising into the collector $j$. The collector $j$ being provided with apertures $n$ in both its inner and outer shells, the small bubbles rising therefrom are well distributed throughout the liquid and rise therethrough until absorbed or until they break upon its surface. The sloping tops of the collectors $j$ and $p$ serve to keep them free from deposits of precipitates.

The belching of gas into the tank through the large pipe $c$ keeps the liquid constantly agitated, thus assisting in the absorption of the gas and also preventing the accumulation of precipitates upon the bottom of the tank or in the conduits. This agitation produces a complete circulation of the liquid, since there are no pockets or horizontal surfaces within the tank. The avoidance of pockets and horizontal surfaces also renders the tank self-cleaning, since it washes itself out and empties completely upon opening the outlet-valve $d$.

I claim—

1. In apparatus for treating liquids with gases, the combination with a tank having a vertically-disposed cylindrical shell and a conical bottom projecting therefrom, of a pipe leading from the lower extremity of said bottom, means connected with said pipe for supplying said tank with liquid and with gas and for discharging the contents of said tank; a circular gas-collector located above the orifice of said pipe, and an annular-shaped gas collector and distributer secured above said circular collector, substantially as set forth.

2. In apparatus for treating liquids with gases, the combination with a tank having a vertically-disposed cylindrical shell and a conical bottom projecting therefrom, of an inlet for gas in said bottom, and a gas collector and distributer located above said inlet comprising a conical top and a cylindrical shell depending therefrom, said collector-shell being provided with apertures, substantially as set forth.

3. In apparatus for treating liquids with gases, the combination with a tank having a vertically-disposed cylindrical shell and a conical bottom projecting therefrom, of an inlet for gas in said bottom, a circular gas-distributer located above said inlet, and an annular-shaped gas collector and distributer secured above said circular distributer, substantially as set forth.

4. In apparatus for treating liquids with gases, the combination with a tank having a vertically-disposed cylindrical shell and a conical bottom projecting therefrom, of an inlet for gas in said bottom, a circular gas-distributer located above said inlet, and a gas collector and distributer secured above the aforesaid distributer comprising inner and outer cylindrical shells having perforations therein and a ridged top covering the annular space between said shells, substantially as set forth.

5. In apparatus for treating liquids with gases, the combination of a tank for liquid, an inlet for gas in the bottom of said tank, and a gas collector and distributer secured above said inlet so as to be immersed in the liquid contents of said tank comprising a substantially vertical shell with suitably-disposed apertures therein and a cover inclosing the top of said shell, substantially as set forth.

6. In apparatus for treating liquids with gases, the combination of a tank for liquid, an inlet for gas in the bottom of said tank, and a gas collector and distributer located above said inlet so as to be immersed in the liquid contents of said tank comprising a conical top and a cylindrical shell depending therefrom, said collector-shell being provided with apertures, substantially as set forth.

7. In apparatus for treating liquids with gases, the combination of a tank for liquid, an inlet for gas in the bottom of said tank, a circular gas distributer located above said inlet, and an annular-shaped gas collector and distributer secured above said circular distributer, substantially as set forth.

8. In apparatus for treating liquids with gases, the combination of a tank for liquid, an inlet for gas in the bottom of said tank, a circular gas-distributer located above said inlet, and a gas-collector and distributer secured above the aforesaid distributer comprising inner and outer cylindrical shells having suitable apertures therein and a ridged top covering the annular space between said shells, substantially as set forth.

In testimony whereof I affix my signature, in the presence of two subscribing witnesses, at Cleveland, Ohio, this 16th day of December, 1905.

HAROLD P. DYER.

Witnesses:
C. S. WANAMAKER,
R. B. SHANK.